Patented Feb. 21, 1939

2,147,672

UNITED STATES PATENT OFFICE 2,147,672

SMELTING AND REFINING PROCESS

Richard Rodrian, Denver, Colo.

No Drawing. Application November 2, 1936,
Serial No. 108,836

8 Claims. (Cl. 75—21)

This invention relates to a smelting process for the recovery of metals from ores and other metal-bearing minerals and materials, and has for its principal object the provision of a process of this character which will result in a more efficient, more economical and higher recovery of the metal values, than any heretofore known process shows.

Another object of the invention is to provide a process for the recovery of metal-values, which will also produce as by-product a slag, which will be useful and valuable for soil treatment and enrichment.

Further objects of the invention are to provide a process which will not require expensive equipment; but which can be profitably used for the treatment of any kind of metal-bearing minerals and materials; and which will be especially valuable for the treatment of difficult complex ores and natural metal sulphides for the recovery of the metals, especially the precious metals therefrom.

Other objects and advantages are inherent in the process and in the products produced thereby. These will become more apparent from the following detailed description of the invention.

Heretofore, there has been no satisfactory smelting process for the treatment of metal sulphides, tellurides, etc. Even common fire assay methods on such materials do not recover the full metal values present. This process relates particularly to the treatment of just such materials.

In the usual roasting and smelting processes for the treatment of such materials, the sulphur contents are oxidized under the influence of heat, and reducing mediums, and driven off mostly as gaseous fumes which also carry off a portion of the valuable metal values. In this improved process, the original sulphur contents are almost wholly retained, and their activity increased to such a degree as to form with the metals present, molten metallic sulphides so that volatilization losses are avoided and an aggregate is produced which can be economically treated for the recovery of all of the original metal values.

In carrying out this improved process, the ores or other metal-bearing materials to be treated are charged into a suitable smelting furnace with suitable flux and are heated to a sufficient temperature to melt the charge and bring the metallic sulphides to a fluid condition.

The materials are preferably smelted in a furnace with a lining, of a type, which will not desulphurize or reduce the metal sulphides.

If the original charge consists principally of metal sulphides, no additional sulphur needs to be added. If, however, the charge contains oxides, carbonates or other materials low in sulphur, additional sulphur must be added either in the form of metal sulphides (pyrites, galena, etc.), or in any other convenient form, to provide sufficient sulphur to convert the metals present into metallic sulphides.

When determining the amount of sulphurous materials to be added, it must be certain, that enough sulphur is present in the charge to change all of the metals present into metal sulphides, so as to insure a complete recovery of the metal values.

The usual charge has to contain sufficient silica for fluxing. If a slight excess of silica is present, the wall or lining of the furnace is better protected. If additional silica is found necessary, it can be added in the form of quartz or sand.

The charge is not roasted before the smelting, so that the sulphur contents are not driven off, but are held in intimate contact with the metals present, so that the sulphur under the influence of the heat, will combine directly with the metals to form metal-sulphides. The metal sulphides melt, intermix and settle to the bottom of the furnace, as molten metal sulphides. The lighter, non-metallic contents form a slag cover over the molten aggregate of metal sulphides, and hold the sulphur contents in contact with the molten metal sulphides at the bottom of the furnace, and the mass of the molten metal sulphides acts as a collector for the metal contents of the charge. All metal contents sink into this molten mass, are converted into metal sulphides, and become a part of the molten mass of metal sulphides.

The melting of the natural metal sulphides, especially pyrites, galena, etc., acts to break down and destroy their crystalline structure, thus causing them to readily release the non-metallic portions from the metallic contents. Occasionally some of the precious metals, such as gold, silver, and metals of the platinum group, when present in sulphurous ores, exist in a sulphided, colloidal-like state, and, when deposited in the molten aggregate of metal sulphides, they change their colloidal-like state into the real sulphide or sulphuret form, and are collected with the other metal sulphide compounds, forming the molten aggregate of metal sulphides.

No carbonaceous reducing mediums, oxidizing materials, or plant life destroying fluxes, such as borax, are added to the charge. Soda ash mixed with silica forms a good fluid flux, or any compounds or rocks, containing potassium, phosphates, etc., may be used.

If the charge contains large amounts of free metals or metal-oxides, a portion of solid metals may sink to the bottom of the molten sulphide mass, without combining with the sulphur to form a solid metal alloy. This solid metal alloy can be easily separated from the metal sulphides and treated in any of the usual ways for the separation of the various metals present.

After the charge has been melted and brought to a good fluid condition, the molten mass is poured into cast-iron moulds and allowed to cool. After cooling, the slag can be easily separated from the solid metal sulphides at the bottom of the moulds. The metal sulphides, removed from the moulds, are quite brittle, and disintegrate into a finely divided metallic powder by their own action, when exposed to the air. To expedite the disintegration, the lumps of metal sulphides may be crushed and pulverized and spread out, so as to obtain a maximum air exposure, and sprinkled with water. The metal sulphides will disintegrate in about 48 hours into an extremely finely divided metallic powder. Most of the sulphur will volatilize and the metals will oxidize, leaving the disintegrated metal sulphides as a powdered mixture of metal oxides, and sulphurets. The fine metallic powder produced by the above action, contains all of the metals present in the original charge and may be treated for the separation of the metals in any desired manner.

The recovery of the metals from these disintegrated metal sulphides can be accomplished in many ways.

One method is to smelt the powder with a carbonaceous reducing medium over a layer of metallic lead. This causes some of the metal contents to combine with the molten lead, after which the various metals will be separated from the lead alloy, in any of the usual ways.

Another method is to treat the metallic powder with various reagents, such as the usual leaching acids, alkalies, cyanides, etc., for the successive recovery of the metals present. If gold and silver are the principal metal contents desired, the entire batch of metallic powder may be washed, neutralized and leached in a cyanide solution to extract the gold and silver. The cyanide solution can then be treated by electrolysis or precipitation for the recovery of the gold and silver. The remaining metals in the metallic powder, if any, can then be recovered in any desired way. If excess copper is present, this will perhaps be removed by an acid or ammonia leaching. The final recovery steps will, of course, depend upon the particular metals, and the quantities thereof, in the charge being treated. The remaining metallic aggregate or powders, after any of these treatments, may still contain metals, especially lead. If so, the remainder may be smelted to produce solid metals.

A commercial example of the improved process is outlined, as follows:

A reverberatory tilting furnace, having a 600 pound capacity, is employed.

The charge comprises:

1. 100 lbs. of galena, containing principally lead, silver, gold, iron in pyrite form, and small amounts of other metals.
2. 100 lbs. of quartz ore, containing principally lead, silver, gold, iron pyrites and small amounts of other metals.
3. 200 lbs. of mill concentrates, containing lead, silver, gold, iron pyrites and other metals.
4. 200 lbs. of soda ash for fluxing purposes.

The entire batch of ore is pulverized to about 10 to 60 mesh, well mixed with the flux and charged into the furnace. A smelting of about four hours places the charge in a satisfactory fluid condition. The charge is then poured into cast iron moulds. The non-metallic slag rises to the top of the moulds and can be easily separated from the solid metal sulphides, settled at the bottom of the moulds, after cooling.

If a stationary smelting furnace is employed, the metal sulphides will be poured off to the slag line, and the slag then can be independently discharged.

The solidified metal sulphides are then separated from the slag, crushed to about 10 to 40 mesh, spread on the floor, and sprinkled with water for faster disintegration and oxidation. After a period of about 20 hours, the metal sulphides are piled. A very active internal combustion takes place in the piles or heaps of the metal sulphides, causing the sulphur contents to separate from the metals as sulphur dioxide, leaving the metal contents as oxides and probably in some instances, as sulphurets.

During the disintegration period, the sulphides disintegrate into a very fine metallic powder containing all of the metals present in the original charge. This metallic powder is then treated in any desired way for the separation and recovery of the metallic contents as above described.

The remaining slag is crushed and pulverized to about 20 to 80 mesh, and is ready for use for agricultural purposes. The slag may also be disintegrated into a fine powder, by wetting it or dropping it into water. This will disintegrate the major portion into a fine powder, while some portion dissolves in the water, forming a useful lye fertilizer.

The slag thus produced in this process has been found valuable for mixture with the light dust soils of the "dustbowl" districts of the United States, to increase the weight of the soil and prevent wind erosion. Since the slag contains mineral fertilizing elements, such as potassium, phosphates, etc., it also forms a very satisfactory mineral fertilizer. It will be noted that the entire charge has been converted into useful and valuable products and by-products. Nothing is wasted as in the usual smelter methods. Millions of dollars are at present lost in the dumps of mines and smelters.

While the invention has been described as particularly applicable to sulphide ores, it is, of course, not limited to this particular kind of ore and the term "ores", as used herein, applies to any metal-bearing materials susceptible to this process.

I have found that this improved process is valuable, not only for ores, but also for the recovery of metals, more particularly, the precious metals, from such materials as black sands, clays, oil shales, residues from sulphuric acid manufacturing or oil distillation, residues and slags from smelters, tailings from other processes, such as the cyanide, amalgamation or chlorine process, etc.

While I have herein illustrated and described in some detail forms of my invention and process, it is understood that the invention is not to be regarded limited to the precise procedure described, except in so far as such limitations are included within the terms of the accompanying claims, in which it is my intention to claim all novelty inherent in my invention as broadly as is permissible in view of the prior art.

Having thus described the invention, what is claimed and desired secured by Letters Patent is:

1. A process for the recovery of metals from metal-bearing materials, comprising: melting said materials in the presence of sulphur to form molten metal sulphides; separating the metal sulphides from the non-metallic slag; crushing said metal sulphides; spreading said metal sulphides to obtain a maximum of air exposure and wetting said metal sulphides to facilitate the disintegration; allowing said wetted spread metal sulphides to lie for a period of hours; piling said metal sulphides in heaps; thence allowing said heaps to stand for a period of hours until the metal sulphides are reduced by oxidation to a finely divided powder; smelting the powder to form an alloy; thence separating the different metals from the latter alloy.

2. A process for the recovery of metals from metal-bearing materials, comprising: melting said materials in the presence of sulphur to form molten metal sulphides; separating the metal sulphides from the non-metallic slag; pulverizing said metal sulphides; spreading said metal sulphides to obtain a maximum of air exposure and wetting said metal sulphides to facilitate the disintegration; allowing said wetted spread metal sulphides to lie for a period of hours; piling said metal sulphides in heaps; thence allowing said heaps to stand for a period of hours until reduced by oxidation to a finely divided powder; extracting a portion of the metal contents from said powder with a cyanide solution; then smelting the remaining metal values of said powder to a solid metal alloy.

3. A process for the recovery of metals from metal-bearing materials, comprising: melting said materials in the presence of sulphur to form molten metal sulphides; separating the metal sulphides from the non-metallic slag; pulverizing said metal sulphides; spreading said metal sulphides to obtain a maximum of air exposure and wetting same with water to facilitate disintegration; allowing said wetted spread metal sulphides to lie for a period of hours; piling said metal sulphides in heaps; thence allowing said heaps to stand for a period of hours until the metal sulphides are reduced by oxidation to a finely divided powder; extracting a portion of the metal contents from said powder with a cyanide solution; thence smelting the remaining metal values of said powder to a solid metal alloy; thence treating this metal alloy to separate and recover the remaining different metals.

4. A process for the recovery of metals from metal-bearing materials, comprising: melting said materials in the presence of sulphur to form molten metal sulphides; separating the metal sulphides from the non-metallic slag; pulverizing said metal sulphides; spreading same to obtain a maximum of air exposure and wetting said metal sulphides with water, to facilitate disintegration; allowing said wetted spread metal sulphides to lie for a period of hours; piling said metal sulphides in heaps; thence allowing said heaps to stand for a period of hours until the metal sulphides are reduced by oxidation to a finely divided powder; thence successively extracting the various metals from said powder.

5. A process for the recovery of metals from metal-bearing materials, comprising: melting said materials in the presence of sulphur to form molten metal sulphides; separating the metal sulphides from the non-metallic slag; pulverizing said metal sulphides; spreading same to obtain a maximum of air exposure and wetting said metal sulphides with water to facilitate disintegration; allowing said wetted spread metal sulphides to lie for a period of hours; piling said metal sulphides in heaps; thence allowing said heaps to stand for a period of hours until reduced by oxidation to a finely divided powder; leaching out certain of the metals from said powder; thence smelting the residual powder for the recovery of the remaining metals.

6. A process for the recovery of metals from metal-bearing materials, comprising: melting said materials in the presence of sulphur to form molten metal sulphides; separating the metal sulphides from the non-metallic slag; pulverizing said sulphides; spreading said metal sulphides to obtain a maximum of air exposure and wetting same with water, to facilitate disintegration; allowing said wetted spread metal sulphides to lie for a period of hours; piling said metal sulphides in heaps; thence allowing said heaps to stand for a period of hours until reduced by oxidation to a finely divided powder; leaching out certain of the metals from said powder; thence smelting the residual powder for the recovery of the remaining metals; thence separating the various metals obtained by this smelting.

7. The process of treating ores for the recovery of the metal values therein, comprising: adding sulphur compounds to said ores; smelting the ores and sulphur compounds beneath a slag blanket to a molten state to produce metal sulphides of the metal contents; separating the metal sulphides from the slag; allowing said metal sulphides to disintegrate and oxidize in the presence of moist air for a period of hours to change the metal sulphides into a finely divided powder of metal oxides; thence directly smelting the said powder to form an alloy; thence individually separating the individual metals from the alloy.

8. A process for the recovery of metals from metal bearing materials comprising: melting said materials in the presence of sulphur to form molten metal sulphides; solidifying said sulphides; crushing the solidified sulphides; allowing said crushed sulphides to oxidize and disintegrate in the presence of air and moisture to a finely divided powder; smelting said powder with a reducing agent to form an alloy; thence separating the individual metals from said alloy.

RICHARD RODRIAN.